July 13, 1926.

R. T. HOSKING

LOCK WASHER FOR COUNTERSUNK HEAD SCREWS

Filed July 16, 1923

1,592,525

INVENTOR
Richard T. Hosking
BY
ATTORNEY

Patented July 13, 1926.

1,592,525

UNITED STATES PATENT OFFICE.

RICHARD THOMAS HOSKING, OF WILMETTE, ILLINOIS, ASSIGNOR TO SHAKEPROOF SCREW & NUT LOCK COMPANY, OF CHICAGO, ILLINOIS, A CORPORATION OF DELAWARE.

LOCK WASHER FOR COUNTERSUNK HEAD SCREWS.

Application filed July 16, 1923. Serial No. 651,797.

This invention relates to an improved conical shaped lock washer for use with countersunk screws and the like. The improvement relates to the locking means.

I provide a locking device whereby the countersunk screw head when forced tight into the conical washer acts to distort a yieldable member of the washer. The said members are twisted spring teeth or prongs that form the edges of the washer, preferably the outwardly flaring edges, although the teeth may if desired be on the inwardly flaring edges or small diameter of the conical washer. The lateral edges of the teeth near the tips of the teeth are thereby made to bite into the conical surface of the screw head and into the countersunk opening in the work, to lock the screw.

With the foregoing and certain other objects in view which will appear later in the specifications my invention comprises the devices described and claimed and the equivalents thereof.

In the drawings—

Figure 1:
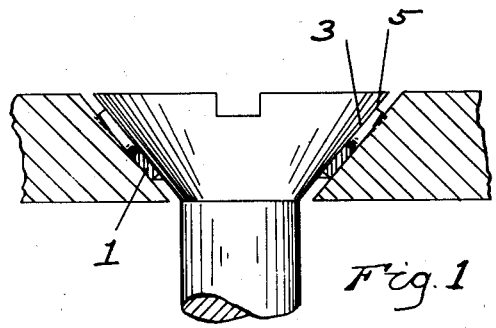
Fig. 1 is a transverse section of a modified form of washer applied to a countersunk screw head.

As is clearly shown in the drawings, the device consists in a conical sheet metal body 1 having a central aperture 2. The outer edge, being the edge at the large diameter of the conical body, is formed into a row of teeth 3 that project outwardly and upwardly; in the preferred form, as shown, the row of teeth conforming in general shape to that of the conical body.

The outer ends or tips 4 of the teeth are axially twisted to an angle of approximately forty five degrees with their initial position.

The body of the tooth from its point to its root is thereby warped, the shape of the tooth at its root conforming to the cone shape of the body. Consequently the tooth at its root fits both the screw head and the countersunk hole in the work.

The tip of each twisted tooth presents, to the face of the screw head and to the work sharp-edged prongs 5 that project respectively inwardly and outwardly from the conical inner and outer surfaces of the washer. Of the four longitudinal edges of each tooth two diagonally opposite ones will form the projecting edges just mentioned and the extremities of these edges form the sharp edged prongs referred to.

The washers are preferably made of sheet steel stamped and pressed to shape. I prefer to employ tempered clock-spring steel or equivalent material, so that the prongs are not only hard and tough, but are highly resilient. Consequently when the screw head is tightened into the washer and the prongs are slightly sprung out of their normally twisted position they will exert strong tendency to return. The prong edges tend to bite into the surface of the countersunk screw head and into the work, thereby locking the work, the screw and the washer together.

Figure 2:
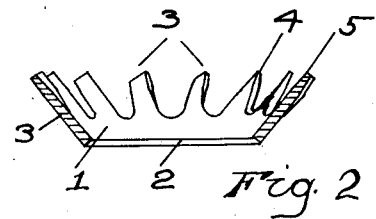
Fig. 2 is an enlarged detail of the form of tooth employed in the structure of Fig. 4.
Figure 3:
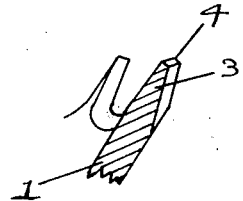
Fig. 3 is a detail of the tooth of Fig. 4, tapered in thickness.

Referring to Figs. 1, 2 and 3, it will be observed that in this form of tooth its thickness near the point is less than at the root.

The purpose of making the outer parts of the teeth thinner than the body of the washer is, as above indicated, to avoid forcing the twisted spring tooth to completely assume the conical shape of the body when the screw is tightened down to the extreme.

The tooth, made thinner than the body, will always remain at a slight angle of twist with respect to the surface of the work and the surface of the screw, even though the screw be tightened down to full compression. By not taking all the twist out of the tooth the prong edges 4 are always in position to bite into the work and into the screw as soon as a tendency to unscrew is developed.

By the means above described I have added to the usual form of plain conical washer a locking device that effectively prevents a conical-headed screw or bolt from unscrewing, even though it is subjected to extreme and long continued vibration.

Having thus described my invention, what I claim and desire to secure by Letters Patent is:

1. A lock washer comprising a centrally apertured conical body, its outer edge shaped to form a row of teeth conforming at their roots to the conical contour of said body, said teeth axially twisted at their outer ends, and of less thickness at their points than at their roots.

2. A lock washer comprising a centrally apertured conical body, its outer edge shaped to form a row of teeth conforming at their roots to the conical contour of said body, said teeth thinner at their outer ends than the body of the washer and axially twisted at their outer ends.

3. A lock washer comprising a centrally apertured conical body formed of stamped and pressed sheet spring metal, the outer edge of said conical body shaped to form a row of resilient teeth conforming at their roots to the conical contour of said body, and warped from their roots to their points, the points of less thickness than the roots of said teeth, for the purposes set forth.

4. A lock washer comprising a centrally apertured conical body, an edge of said body shaped to form a row of teeth conforming at their roots to the conical contour of said body, said teeth axially twisted at their outer ends, and being of less thickness near their points than at their roots.

5. A lock washer comprising a centrally apertured conical body of sheet spring metal, an edge of said conical body shaped to form a row of resilient teeth conforming at their roots to the conical contour of said body, and warped from their roots to their points, said roots of greater thickness than said points, for the purposes set forth.

6. A lock washer comprising a substantially cone-shaped body of sheet spring metal, a row of resilient projections formed thereon and normally extending respectively inwardly and outwardly from the cone-shaped inner and outer surfaces of the washer and being thinner at their outer ends than at their points of attachment to said body, for the purposes set forth.

In testimony whereof, I affix my signature.

RICHARD THOMAS HOSKING.